United States Patent Office 3,497,455
Patented Feb. 24, 1970

3,497,455
LOW DENSITY FOAMED METAL OXIDES
Robert Louis Ahr, Sharonville, Ohio, assignor to Morton International, Inc., Chicago, Ill., a corporation of Delaware
No Drawing. Continuation of application Ser. No. 485,118, Sept. 3, 1965. This application Jan. 13, 1969, Ser. No. 800,322
Int. Cl. E04b 1/74; B29h 7/20
U.S. Cl. 252—62
20 Claims

ABSTRACT OF THE DISCLOSURE

Foamed metallic oxides are formed by adding a frothing agent to an aqueous solution of the corresponding metal salt, beating vigorously to form a non-collapsing foam and thereafter gradually heating the foam up to about 3000° F. to form the porous product. The foamed metallic oxides which may be so formed are those of the elements of Group II-A, Group III-A, Group IV-B, the transition elements, the actinide elements, and the lanthanide elements.

---

This is a continuation of application Ser. No. 485,118, filed Sept. 3, 1965 and now abandoned.

This invention relates to improved sintered metallic oxides in porous, light weight, cellular form having a multiplicity of interstices and to a process for preparing such oxides. More particularly, this invention relates to improved sintered or calcined magnesium oxide in porous, light weight, cellular form having a multiplicity of interstices and to a process for its preparation.

Some examples of the utility of the compositions produced by the process of the present invention are as insulating materials for furnaces where heat-resistant refractory properties are essential, for ordinary construction purpose insulation, as high temperature filters for molten metals, and as catalyst substrates or supports.

Prior art techniques for the production of porous or foamed oxides of metals and particularly of magnesium oxide have employed a variety of foaming procedures and have generally involved the use of the corresponding oxide as a starting material. In the particular instance of the preparation of magnesium oxide foams, magnesia particles have been suspended in various frothy media, dried and sintered. This procedure resulted in a cellular product which had a bulk density of approximately 40 pounds per cubic foot. Since magnesia has a theoretical density of about 223 pounds per cubic foot, a density of 40 pounds per cubic foot is about 18% of theoretical density. Among some other foamed oxides commercially available are foamed alumina with a density of about 29 pounds per cubic foot and zirconia with a density of about 37.5 pounds per cubic foot. These densities are approximately 11% of theoretical density, respectively.

However, the use of a metallic oxide for producing the corresponding foamed oxide inherently defines the physical characteristics of the resultant product and virtually precludes the provision of foamed oxides with densities significantly lower than those hitherto available.

Inasmuch as metallic oxides in general have desirable refractory properties and inasmuch as the foamed or porous form of metallic oxides have valuable insulating and carrier properties which are directly related to porosity, it would be desirable to provide, by an improved and simplified process, foamed metallic oxides of reduced density and enhanced porosity.

It is therefore an object of this invention to provide sintered metallic oxides in porous cellular form, containing a multiplicity of interstices and having a lesser density than metallic oxide hitherto available.

It is another object of this invention to provide sintered metallic oxides in porous, cellular form containing a multiplicity of interstices and having a density of from about 1.5 to about 9 percent of theoretical density.

It is still another object of the present invention to provide an improved process for preparing a metallic oxide in porous, light weight, cellular form.

It is a further object of the present invention to provide an improved process for preparing a metallic oxide in porous, light weight, self-supporting, dry cellular form having a density of from about 1.5 to about 9 percent of theoretical density which process does not depend on the use of the corresponding metallic oxide as a starting material.

It is a more specific object of the present invention to provide sintered magnesium oxide in porous, cellular form containing a multiplicity of interstices and having a density of from about 1.8% to about 3.5% of theoretical density.

It is a still further object of the present invention to provide an improved process for preparing magnesium oxide in porous, cellular form containing a multiplicity of interstices and having a density of from about 1.8 to about 3.5 of theoretical density, which process does not depend upon the use of magnesium oxide as a starting material.

These and other objects of the present invention will be more readily understood by reference to the following specification and claims.

Accordingly, in one broad form, the process of the present invention comprises dissolving in water at least one water soluble salt of a metallic element selected from the following groups of the periodic table of elements: Group II-A, Group III-A, Group IV-B, the transition elements, the actinide elements, and the lanthanide elements, adding thereto a frothing agent, beating to form a foam and heating the resultant foam gradually from ambient temperature to a temperature of about 3000° F. to form the finished product.

In another broad form the present invention comprises a metallic oxide in porous, unified cellular form having a multiplicity of interstices and a density of from about 1.5 to about 9 percent of theoretical density, said oxide consisting of at least one oxide of an element selected from the group consisting of Group II-A, Group III-A, Group IV-B, the transition elements, the actinide elements and the lanthanide elements of the periodic table of elements and having a density of from about 1.5 to about 9 percent of the theoretical density. The periodic table to which reference is made appears on pages 448–449, Handbook of Chemistry & Physics—Chemical Rubber Publishing Co., 44th Ed. 1962–63 (1962).

Although the water soluble salts of any of the elements of the groups enumerated above the operative in the present invention, the preferred starting compounds are the water soluble salts of magnesium, calcium, aluminum, titanium, zirconium, chromium, cerium and thorium. The salts of these elements which are preferred because of their water solubility are the halides such as chlorides and bromides, nitrates, sulfates, oxysulfates and acetates. However, it is emphasized that in specific instances other compounds will serve, the criterion of operability being water solubility, formation of a metal oxide on ignition and substantial removal of the anion by volatilization during ignition. Complex foamed porous oxide products having a preselected composition may be produced by the use of admixtures of two or more water soluble compounds of the aforementioned elements. Additionally, small quantities of various additives may be incorporated into the reactants to impart desirable features to the finished oxide.

The water soluble metal salts or compounds used in the process of the present invention are employed in the proportion of about 0.2 to about 3 parts by weight per part by weight of water depending upon solubility. Although amounts outside these ranges are generally useful, the finished product has more useful physical characteristics when the above proportions are employed.

Frothing agents which may be used are those which function to incorporate and retain air in the whipped solution containing the dissolved metallic salt or salts and which give body to the resultant foam so that it retains its shape during calcining without melting or causing the foam to collapse. Generally the frothing agent should be an organic or volatilizable compound which is substantially volatilized during the ignition step. Some frothing agents which possess these requisite properties and which have been successful in this application are dried egg albumen (commercial meringue), sodium carboxymethylcellulose, polyvinyl alcohol and methylcellulose. The amount of frothing agent which is useful in the process of the present invention is at least about 0.05 part and preferably from about 0.05 part to about 0.7 part per part of water.

More specifically in the preparation of foamed MgO, the preferred procedure comprises dissolving from about 0.2 to about 3 parts by weight of magnesium chloride in about 1 part by weight of water, adding thereto from about 0.05 to about 0.7 part by weight of frothing agent, and then whipping the resultant admixture vigorously to provide a foam of proper consistency which is self-supporting. Any suitable mixing device which is capable of imparting a vigorous beating action to the solution is useful in the present invention. Low density foams with a uniform and small cell structure are obtained with vigorous whipping action which incorporates a large volume of air into the foam. Although the foam may be formed at any temperature, it is preferred to whip a warm solution as this produces a foam having a multiplicity of small, uniform cells. The freshly prepared foam, sometimes known as a "green" foam, is either air-dried or immediately placed in a furnace which is then heated over a period of about 90 minutes from ambient temperature to a temperature of at least about 2600° F.

if heating is too slow at the higher temperatures, the active oxides that are produced from the decomposition of the salts lose their reactivity before they are sintered. A typical heating cycle for the preparation of a foamed oxide is given below:

| Temperature °F. | Approximate time to attain the indicated temperature, minutes |
|---|---|
| Ambient temperature | 0 |
| 500 (260° C.) | 4 |
| 1000 (538° C.) | 7 |
| 1500 (816° C.) | 12 |
| 2000 (1093° C.) | 24 |
| 2600 (1426° C.) | 90 |

The highest temperature of the firing cycle will determine, for the most part, the final strength of the foamed oxide. Temperatures of at least about 2600° F. or higher are generally required before appreciable sintering takes place, and the higher the final firing temperature the greater the strength of the resultant cellular oxide.

Although small celled, light weight, porous, refractory foamed oxides are produced by the process of the present invention, it is understood that the actual density, cell size and strength of the final product depend on the type of metal salt used, the mixing procedure employed and the firing techniques. In the instance of foamed magnesia, the density of the product varies from a low of about 4 pounds per cubic foot to a high of about 10 pounds per cubic foot.

The particular oxide obtained in any specific instance depends on the identity of the metal salt used initially. Thus, X-ray analyses indicate that MgO is produced from magnesium salts, $Al_2O_3$ from aluminum chloride, $ThO_2$ from thorium chloride, $CeO_2$ from ceric chloride, $Cr_2O_3$ from chromic chloride and $TiO_2$ from titanium tetrachloride. The actual purities of the final oxide foams depend, of course, on the purity of the metal salts used. Complex foamed oxide mixtures containing for example MgO and CaO, and MgO and $Al_2O_3$ may be obtained by using as reactants mixtures of the corresponding water soluble metallic salts in the stoichiometric ratio desired in the resultant oxide product. To illustrate, magnesium aluminum oxide spinel ($MgAl_2O_4$) may be obtained by using as reactants an admixture of magnesium chloride and aluminum chloride in the ratio of one mole of magnesium chloride to two moles of aluminum chloride.

It is emphasized that the foamed oxides of the present invention are porous, cellular in foam and extremely light weight having bulk densities varying from a low of about 1.5 to a high of about 9 percent of theoretical density.

The following chart illustrates the densities obtained for various foamed oxides prepared by the practice of the present invention and compares them with those which are commercially available:

FOAMED OXIDES

| Product | Theoretical density (lbs./cu. ft.) | Density of product of present invention (lbs./cu. ft.) | Density of commercially available product (lbs./cu. ft.) | Percent of theoretical density | |
|---|---|---|---|---|---|
| | | | | Present product | Commercially available product |
| MgO* | 223 | 4.0 | 40.0 | 1.8 | 18.0 |
| $Al_2O_3$ | 249 | 6.4 | 29.0 | 2.6 | 11.7 |
| $Cr_2O_3$ | 325 | 5.0 | | 1.5 | |
| $TiO_2$ | 265 | 12.5 | | 4.7 | |
| $ThO_2$ | 624 | 44.0 | | 7.0 | |
| $ZrO_2$ | 345 | 19.0 | 37.5 | 5.5 | 10.8 |
| $CeO_2$ | 455 | 40.0 | | 8.8 | |

*Densities for MgO ranging up to 7.5 lbs./cu. ft. are obtained under varying conditions of preparation. See examples I to VII and XII following.

The foam-heating cycle is controlled over a period of time in order to obtain a foamed product having optimum properties with respect to minimal density, maximum strength and optimum refractory characteristics. Heating the green foam too rapidly, such as placing it directly into a hot furnace, results in disintegration of the foam due to the rapid escape of gases. Heating too slowly may cause collapse of the foam before sintering occurs. In addition, It is thus apparent that the products of the present invention have densities which are significantly lower than comparable commercially available materials.

For a complete understanding of the present invention, reference is now made to the following specific examples illustrating the preparation of light weight, porous metallic oxides.

EXAMPLE I

One hundred grams of magnesium chloride hexahydrate ($MgCl_2 \cdot 6H_2O$) were disssolved in 250 grams of water. Seventy-five grams of dried egg albumen (commercial meringue) were added and the admixture was whipped vigorously to form a foam. The resultant foam was placed in a suitable mold and fired in a furnace in accordance with the following heating schedule:

| Temperature, °F. | Approximate time to attain the indicated temperature, minutes |
|---|---|
| Ambient temperature | 0 |
| 500 (260° C.) | 4 |
| 1000 (538° C.) | 7 |
| 1500 (816° C.) | 12 |
| 2000 (1093° C.) | 24 |
| 2600 (1426° C.) | 90 |

The product obtained was magnesium oxide in porous, cellular form having a density of approximately 7.5 pounds per cubic foot. This density is about 3.4 percent of theoretical density.

EXAMPLE II

The procedure of Example I was followed except that 200 grams of magnesium chloride hexahydrate were used. The product obtained was magnesium oxide in porous, cellular form having a density of approximately 5.4 pounds per cubic foot which is about 2.4 percent of theoretical density.

EXAMPLE III

The procedure of Example I was followed except that 400 grams of magnesium chloride hexahydrate were used. The product obtained was magnesium oxide in porous, cellular form having a density of approximately 4.0 pounds per cubic foot, which is about 1.8 percent of theoretical density.

EXAMPLE IV

The procedure of Example I was followed except that 500 grams of magnesium chloride hexahydrate were used. The product obtained was magnesium oxide in porous, cellular form having a density of approximately 4.7 pounds per cubic foot, which is about 2.1 percent of theoretical density.

EXAMPLE V

Five hundred grams of magnesium chloride hexahydrate were dissolved in 250 grams of water. Twenty-five grams of dried egg albumen (meringue) were added and the admixture was whipped vigorously to form a foam. The resultant foam was fired in a furnace in accordance with the heating schedule of Example 1. The product obtained was magnesium oxide in porous, cellular form having a density of approximately 4.7 pounds per cubic foot.

EXAMPLE VI

The procedure of Example V was followed except that 50 grams of dried egg albumen were used. The product obtained was magnesium oxide in porous, cellular form having a density of about 4.7 pounds per cubic foot.

EXAMPLE VII

The procedure of Example V was followed except that 100 grams of dried egg albumen were used. The product obtained was magnesium oxide having a density of about 4.7 pounds per cubic foot.

EXAMPLE VIII

Three hundred and twenty grams of ceric sulfate were dissolved in 110 grams of water. Seventy grams of dried egg albumen (meringue) were added and the admixture was whipped vigorously to form a foam. The resultant foam was fired in accordance with the heating schedule of Example I, except that the highest temperature attained was 1900° F. The product obtained was ceric oxide ($CeO_2$) in porous, cellular form having a density of approximately 40 pounds per cubic foot. This density is about 9 percent of theoretical density.

EXAMPLE IX

One hundred grams of chromic chloride hexahydrate ($CrCl_3 \cdot 6H_2O$) were dissolved in 52 grams of water. Fifteen grams of dried egg albumen (meringue) were added and the admixture was whipped vigorously to form a foam. The resultant foam was fired in accordance with the heating schedule of Example I, except that the highest temperature attained was 2950° F. The product obtained was chromic oxide ($Cr_2O_3$) in porous, cellular form having a density of approximately 5 pounds per cubic foot. This density is about 1.5 percent of theoretical density.

EXAMPLE X

One hundred and thirteen grams of zirconium sulfate tetrahydrate ($Zr(SO_4)_2 \cdot 4H_2O$) were added to one hundred and ten grams of water. Fifteen grams of dried egg albumen (meringue) were added and the mixture was whipped to form a foam. The resultant foam was fired in accordance with the heating schedule of Example I, except that the highest temperature attained was 2700° F. The product obtained was zirconium oxide ($ZrO_2$) in porous, cellular form having a density of about 19 pounds per cubic foot. This density is about 5.5 percent of theoretical density.

EXAMPLE XI

One hundred grams of titanium oxysulfate ($TiOSO_4$) were added to one hundred grams of water. Ten grams of dried egg albumen (meringue) were added and the mixture was whipped to form a foam. The resultant foam was fired in accordance with the heating schedule of Example I, except that the highest temperature attained was 2900° F. The product obtained was titanium dioxide ($TiO_2$) in porous, cellular form having a density of about 12.5 pounds per cubic foot. This density is about 5% of theoretical density.

EXAMPLE XII

One hundred grams of magnesium chloride hexahydrate ($MgCl_2 \cdot 6H_2O$) were added to 250 grams of water. Seventy-five grams of dried egg albumen (meringue) were added and the mixture was whipped to form a foam. The resultant foam was fired in accordance with the heating schedule of Example I, except that the highest temperature attained was 2900° F. The product obtained was magnesium oxide (MgO) in porous, cellular form having a density of about 7 pounds per cubic foot. This density is about 3% of theoretical density.

EXAMPLE XIII

Three hundred and fifty grams of zirconium tetrachloride ($ZrCl_4$) were added to 250 grams of water. One hundred and fifty grams of dried egg albumen (meringue) were added and the mixture was whipped to form a foam. The resultant foam was fired in accordance with the heating schedule of Example I. The product obtained was zirconium oxide ($ZrO_2$) in porous, cellular form having a density of about 17 pounds per cubic foot. This density is approximately 5% of theoretical density and compares with foamed zirconia commercially available having a density of 37.5 pounds per cubic foot.

EXAMPLE XIV

One hundred grams of thorium tetrachloride were added to one hundred and fifty grams of water. Seventy-five grams of dried egg albumen (meringue) were added and the mixture was whipped to form a foam. The resultant foam was fired in accordance with the heating schedule of Example I. The product obtained was thorium oxide ($ThO_2$) in porous, cellular form having a density of about 44 pounds per cubic foot. This density is approximately 7.0% of theoretical density.

EXAMPLE XV

One hundred grams of aluminum chloride ($AlCl_3$) were added to 250 grams of water. Seventy-five grams of dried egg albumen (meringue) were added and the mixture was whipped to form a foam. The resultant foam was fired in accordance with the heating schedule of Example I. The product obtained was aluminum oxide ($Al_2O_3$) in porous, cellular form having a density of about 6.4 pounds per cubic foot. This density is approximately 2.6% of theoretical density and compares with foamed alumina commercially available having a density of 29 pounds per cubic foot.

I claim:
1. A metallic oxide in porous, unified, cellular form having a multiplicity of interstices and a density of from about 1.5 to about 9 percent of theoretical density, said oxide consisting essentially of at least one oxide of an element selected from the group consisting of Group II–A, Group III–A, Group IV–B, the transition elements, the actinide elements, and the lanthanide elements of the periodic table appearing on pages 448–449, Handbook of Chemistry & Physics—Chemical Rubber Publishing Co., 44th Ed. 1962–1963 (1962).
2. A metallic oxide according to claim 1, formed of magnesium oxide and having a density of from about 1.8 to about 3.5 percent of theoretical density.
3. A metallic oxide according to claim 1, formed of aluminum oxide and having a density of about 3 percent of theoretical density.
4. A metallic oxide according to claim 1, formed of titanium oxide and having a density of about 5 percent of theoretical density.
5. A metallic oxide according to claim 1, formed of zirconium oxide and having a density of about 5 percent of theoretical density.
6. A metallic oxide according to claim 1 formed of chromium oxide and having a density of about 1.5 percent of theoretical density.
7. A metallic oxide according to claim 1 formed of thorium oxide and having a density of from about 7 percent of theoretical density.
8. A metallic oxide according to claim 1, formed of cerium oxide and having a density of about 9 percent of theoretical density.
9. A mixture of magnesium oxide and calcium oxide in porous, cellular form having a multiplicity of interstices and a density of from about 2 to 7 percent of theoretical density and wherein the ratio of magnesium oxide and calcium oxide is from 0.2 to 1 part magnesium oxide to from 0.2 to 1 part of calcium oxide.
10. A mixture of magnesium oxide and aluminum oxide in porous, cellular form having a multiplicity of interstices and a density of from about 2 to about 9 percent of theoretical density and wherein the ratio of magnesium oxide and aluminum oxide is from 0.2 to 1 part magnesium oxide to from 0.2 to 1 part of aluminum oxide.
11. A process for preparing a porous, cellular metallic oxide product having a multiplicity of interstices which comprises dissolving in water from about 0.2 to about 3 parts per part of water of at least one water soluble salt of a metallic element selected from the group consisting of the elements of Group II–A, III–A, Group IV–B, the transition elements, the actinide elements and the lanthanide elements of the periodic table of elements appearing on pages 448–449, Handbook of Chemistry & Physics, Chemical Rubber Publishing Co., 44th Ed. 1962–1963 (1962), adding thereto from about 0.05 to about 0.7 part of a frothing agent selected from the group consisting of egg albumen, polyvinyl alcohol, sodium carboxymethyl-cellulose and methylcellulose whipping the resultant admixture to form a self-supporting foam and gradually heating said foam at a temperature of from ambient temperature to at least about 2600° F. over a period of time of up to at least about 90 minutes.
12. A process according to claim 11, for preparing magnesium oxide in porous, cellular form wherein said water soluble salt of a metallic element is a magnesium salt.
13. A process according to claim 11, for preparing aluminum oxide in porous, cellular form wherein said water soluble salt of a metallic element is an aluminum salt.
14. A process according to claim 11, for preparing titanium oxide in porous, cellular form wherein said water soluble salt of a metallic element is a titanium salt.
15. A process according to claim 11, for preparing zirconium oxide in porous, cellular form wherein said water soluble salt of a metallic element is a zirconium salt.
16. A process according to claim 11, for preparing chromium oxide in porous, cellular form wherein said water soluble salt of a metallic element is a chromium salt.
17. A process according to claim 11, for preparing thorium oxide in porous, cellular form wherein said water soluble salt of a metallic element is a thorium salt.
18. A process for preparing cerium oxide in porous, cellular form having a multiplicity of interstices which comprises dissolving from about 0.2 to about 1 part of a water soluble cerium salt in about 1 part of water, adding thereto from about 0.05 to about 0.7 part of egg albumen, whipping the resultant admixture to form a foam and gradually heating the resultant foam from ambient temperature to up to about 1900° F. over a period of up to about 90 minutes.
19. A process according to claim 11 for preparing a mixture of magnesium and calcium oxides in porous, cellular form having a multiplicity of interstices which comprises dissolving in about 1 part of water from about 0.2 to about 1 part of a water soluble magnesium salt, and from about 0.2 to about 1 part of a water soluble calcium salt, adding thereto from about 0.05 to about 0.7 part of egg albumen, whipping the resultant admixture to form a foam and heating the resultant foam from ambient temperature to at least about 2600° F. over a period of up to at least about 90 minutes.
20. A process according to claim 11, for preparing a mixture of magnesium and aluminum oxides in porous, cellular form having a multiplicity of interstices which comprises dissolving in about 1 part of water from about 0.2 to about 1 part of a water soluble magnesium salt and from about 0.2 to about 1 part of a water soluble aluminum salt, adding thereto from about 0.05 to about 0.7 part of egg albumen, whipping the resultant admixture to form a foam and heating the resultant foam from ambient temperature to at least about 2600° F. over a period of up to at least about 90 minutes.

References Cited

UNITED STATES PATENTS

| | | | |
|---|---|---|---|
| 3,041,190 | 6/1962 | Griffith et al. | 252—62 |
| 3,130,008 | 4/1964 | Stokes et al. | 23—145 |
| 3,223,538 | 12/1965 | Wiegert et al. | 106—57 |
| 3,273,962 | 9/1966 | Walsh | 23—145 |

OTHER REFERENCES

Clayton, Theory of Emulsions, Blakiston Co., 1954, 5th ed., pp. 46–47.

MAYER WEINBLATT, Primary Examiner

I. GLUCK, Assistant Examiner

U.S. Cl. X.R.

75—222; 106—86, 122; 264—42, 43